United States Patent
Takahashi

(10) Patent No.: US 7,769,294 B2
(45) Date of Patent: Aug. 3, 2010

(54) OPTICAL TRANSMISSION NETWORK

(75) Inventor: Tsukasa Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 786 days.

(21) Appl. No.: 11/598,129

(22) Filed: Nov. 13, 2006

(65) Prior Publication Data

US 2007/0177875 A1    Aug. 2, 2007

(30) Foreign Application Priority Data

Jan. 31, 2006    (JP) ............................ 2006-023377

(51) Int. Cl.
*H04J 14/02* (2006.01)
*H04J 14/00* (2006.01)
(52) U.S. Cl. ............................ 398/79; 398/83; 398/85; 398/43
(58) Field of Classification Search .................. 398/79, 398/83, 85, 87, 82, 43, 42
See application file for complete search history.

(56) References Cited

U.S. PATENT DOCUMENTS 6,205,268 B1 * 3/2001 Chraplyvy et al. ............ 385/24

2003/0118316 A1 * 6/2003 Ohara et al. ................ 385/142
2005/0226619 A1   10/2005 Claringburn

FOREIGN PATENT DOCUMENTS

JP    2004-166300    6/2004
JP    2005-520434    7/2005

* cited by examiner

*Primary Examiner*—M. R. Sedighian
(74) *Attorney, Agent, or Firm*—Fujitsu Patent Center

(57) ABSTRACT

In an optical transmission network of the present invention, an optical signal output from a CWDM unit is combined on an optical transmission path of a DWDM network via a multiplexing filter arranged on a light output terminal of a DWDM unit adjacent to the CWDM unit. Furthermore, an optical signal propagated on an optical transmission path is branched from the DWDM light by a de-multiplexing filter provided on a light input terminal of an adjacent DWDM unit, and applied to a CWDM unit adjacent to the DWDM unit. As a result, it is possible to mutually connect a plurality of CWDM networks, using an optical transmission path of a DWDM network, and it is possible to realize a longer distance for CWDM networks.

9 Claims, 8 Drawing Sheets

EXAMPLE OF USAGE WAVELENGTHS
IN GENERAL CWDM NETWORK 1470 1490 1510 1530 1550 1570 1590 1610 1630

EXAMPLE OF USAGE WAVELENGTHS
IN GENERAL DWDM NETWORK
(C-BAND CASE)

1470 1490 1510 1530 1550 1570 1590 1610 1630

EXAMPLE OF USAGE WAVELENGTHS
IN GENERAL DWDM NETWORK
(L-BAND CASE)

DWDM (L BAND) WAVELENGTH

EXAMPLE OF USAGE WAVELENGTHS
IN PRESENT OPTICAL TRANSMISSION NETWORK
CWDM + DWDM (C-BAND)

OPTICAL TRANSMISSION NETWORK

BACKGROUND OF THE INVENTION

1. Field of the Invention

The present invention relates to an optical transmission network (hereunder called a CWDM network) which adopts a coarse wavelength division multiplexing (CWDM) system, and in particular to technology for realizing a connection between different CWDM networks using transmission paths or the like of an optical transmission network which employs a dense wavelength division multiplexing (DWDM) system (hereunder called a DWDM network).

2. Description of the Related Art

In the conventional DWDM network, as shown for example at the upper part of FIG. 9, double core one-way communication where a multi wavelength optical signal is combined in a single optical fiber and transmission is performed in the same direction, is common. Thus, when performing communication between terminals, two fibers are required. In the case of performing long distance transmission, a linear relay apparatus which includes an optical amplifier is provided between respective terminals, and relay transmission of DWDM light is performed while collectively amplifying optical signals which are propagated and attenuated on the optical fiber. The usage wavelength band width of the optical signal of the C-band and the L-band which is transmitted with a DWDM network, is approximately 30 nm for each band, and by adopting a network configuration where an erbium doped fiber amplifier (EDFA) is applied to the linear relay apparatus, the above long distance transmission of DWDM light becomes possible.

For the conventional CWDM network, as shown at the lower part of FIG. 9, single core two-way communication which performs mutual communication with a single optical fiber, is common. This is a low priced attractive network in which compared to the aforementioned DWDM network, the usage wavelengths (channels) are reduced, and moreover low cost transmitters or optical filters can be used since temperature control of the laser mounted on the transmitter is not performed (refer for example to Japanese Unexamined Patent Publication No. 2004-166300). In such a CWDM network, since the usage wavelength range is wide compared to the aforementioned DWDM network, the difference in the wavelength-dependent loss for each of the wavelengths (channels) after fiber transmission is great, and a difference occurs in the transmission distance due to the wavelength, so that the transmittable distance of the equipment constituting the network is restricted. More specifically, the equipment specification is matched with the wavelength of which the transmission distance is short. Furthermore, since temperature control of the laser is not performed, the usage wavelength width of the channel unit is wide (approximately 20 nm), which has the demerit in that an EDFA commonly used in DWDM networks cannot be used. Therefore, the CWDM network is not suitable in long distance transmission as with the DWDM network, and is principally applied to small scale networks.

Furthermore, as conventional technology related to add/drop nodes of a DWDM network, for example in Japanese Unexamined Patent Publication No. 2005-520434, in a DWDM network 10 as shown in FIG. 10, a technique is proposed where a remote node 120 for adding/dropping an optical signal of 1300 nm wavelength on the network is provided between any of a plurality of 1550 nm nodes 112, 114, 116, 118 for adding/dropping an optical signal of 1550 nm band on the network, and at the remote node 120, an optical signal of 1300 nm which is added on the network is sent to an adjacent 1550 nm node, and converted to an optical signal of 1550 nm band in a transponder, and transmitted on a DWDM network. According to this conventional technology, an operation is possible where the optical signal of 1300 nm added from the remote node 120 is converted to an optical signal of 1550 nm capable of long distance transmission on the DWDM network, and dropped at the desired 1550 nm node, or alternatively, the optical signal of 1550 nm band added from the 1550 nm node is converted to an optical signal of 1300 nm at the 1550 nm node adjacent to the remote node 120, and dropped at the remote node 120.

Incidentally, the conventional DWDM network and the CWDM network as described above normally each constitute an independent network, and since there are physical restrictions (for example specifications etc. for the usage wavelength band, the spectrum width of the light source, and the optical multiplexing/de-multiplexing filter) or differences in transmission characteristics, these do not become configurations which can communicate (carry) optical signals between different networks such as from CWDM to DWDM, or from DWDM to CWDM. However, there is a demand for connecting alternate CWDM networks and performing long distance transmission, in particular places or sections where CWDM networks are constructed, but corresponding with the long distance of CWDM networks has become a problem.

In the conventional technology related to add/drop networks of the aforementioned DWDM networks, an optical signal of 1300 nm applied to a remote node has been considered to replace the optical signal from the CWDM network to thereby enable carrying an optical signal between the DWDM network and the CWDM network. However, since one remote node only is arranged on the DWDM network, then for example it is difficult to use an optical transmission path of a DWDM network connected between a plurality of CWDM networks which are provided in different regions which are far apart. In other words, being able to directly add/drop CWDM light on a DWDM network applying the conventional technology is limited to single locations of remote nodes. Hence a plurality of CWDM networks cannot be connected on a DWDM network, and from the view point of correspondence with even longer distances for CWDM networks, this is insufficient.

SUMMARY OF THE INVENTION

The present invention addresses the above points with an object of providing an optical transmission network capable of realizing longer distances for CWDM networks by using an optical transmission path of a DWDM network to mutually connect a plurality of CWDM networks.

The optical transmission network of the present invention for achieving the above object is one where a DWDM network is used to mutually connected between a plurality of CWDM networks. The DWDM network comprises: a set of terminal equipment; an optical transmission path which connects between the terminal equipment; and at least one repeater device having an optical amplifier for collectively amplifying DWDM light, and which is arranged on the optical transmission path. This optical transmission network comprises: a multiplexing section which is adjacent to one CWDM network of the plurality of CWDM networks, and is arranged on a light output terminal of either one of the terminal equipment and the repeater device, and which combines the optical signal of other than a usage wavelength band of the DWDM light, of the optical signals transmitted by the CWDM network, on the optical transmission path of the DWDM network, and a de-multiplexing section adjacent to the terminal equipment or the repeater device in which said multiplexing section is arranged on the light output terminal, and arranged on a light input terminal of either one of the repeater device and the terminal equipment, and which branches an optical signal from the CWDM network which is combined on the optical transmission path, via the multiplexing section, and applies the branched optical signal to another CWDM network adjacent to the repeater device or the terminal equipment.

In the optical transmission network of the above described configuration, the optical signal outside of the usage wavelength band of the DWDM light, of the optical signals which are transmitted by the CWDM network, is combined on the optical transmission path of the DWDM network via the multiplexing section which is provided on the light output terminal of the adjacent DWDM unit. Furthermore, an optical signal propagated on the optical transmission path is branched from the DWDM light by the demultiplexer provided on the light input terminal of the adjacent DWDM unit, and applied to an adjacent other CWDM network. As a result, between a plurality of CWDM networks which are independently provided at separated locations is mutually connected using the light transmission path of a DWDM network.

Furthermore, as a specific configuration for the optical transmission network, the DWDM network may have a first optical transmission path which transmits DWDM light between the terminal equipment in a first direction, and a second optical transmission path which transmits in a second direction opposite to the first direction, and when the repeater device includes a first optical amplifier which collectively amplifies the DWDM light transmitted on the first optical transmission path, and a second optical amplifier which collectively amplifies the DWDM light transmitted on the second optical transmission path, there may be provided; a first multiplexing section which is adjacent to one CWDM network of the plurality of CWDM networks, and is arranged on a light output terminal corresponding to the first optical transmission path of either one of the terminal equipment and the repeater device, and which combines the optical signal of other than that a usage wavelength band of the DWDM light, of the optical signals transmitted by the CWDM network, on the first optical transmission path; a second multiplexing section adjacent to the terminal equipment or the repeater device which is arranged with the first multiplexing section on the light output terminal, and arranged on a light output terminal corresponding to the second optical transmission path of either one of the repeater device and the terminal equipment, and which combines the optical signal of other than that a usage wavelength band of the DWDM light, of the optical signals transmitted by the CWDM network, on the second optical transmission path; a first de-multiplexing section which is arranged on an optical input terminal corresponding to the first optical transmission path of the repeater device or the terminal equipment in which the second multiplexing section is arranged, which branches the signal light from the one CWDM network which is combined on the first optical transmission path, via the first multiplexing section, and applies the branched optical signal to the other CWDM network, and a second de-multiplexing section which is arranged on an optical input terminal corresponding to the second optical transmission path of the repeater device or the terminal equipment in which the first multiplexing section is arranged, which branches the signal light from the other CWDM network which is combined on the second optical transmission path, via the second multiplexing section, and applies the branched optical signal to the one CWDM network.

In the optical transmission network of the above described configuration, in the DWDM network of the double core one-way communication method, by providing a first multiplexing section and a first de-multiplexing section on the first optical transmission path, and providing a second multiplexing section and a second de-multiplexing section on the second optical transmission path, the signal light of the CWDM can be transmitted in both directions between the plurality of CWDM networks, using the first and second transmission paths of the DWDM network.

Furthermore, for the above mentioned optical transmission network, when the other CWDM network is adjacent to one terminal equipment of the DWDM network, the one terminal equipment may have a signal conversion section which converts the optical signal which is branched by the first de-multiplexing section and which is sent to the other CWDM network, into an optical signal corresponding to a DWDM mode, and sends this to the second optical transmission path, and the other terminal equipment may have a signal re-conversion sections which re-converts the optical signal which is converted by the signal conversion section and transmitted by the second optical transmission path, into an optical signal of a CWDM mode, and applies the reconverted optical signal to an adjacent other CWDM network.

In the above described configuration, signal conversion from CWDM to DWDM is performed by one of the terminal equipments of the DWDM network, and the converted optical signal is repeater transmitted up to the other terminal equipment. Then signal conversion is again performed from DWDM to CWDM, and this re-converted optical signal is applied to the CWDM network. As a result, it is possible to connect between CWDM networks extending over a long distance.

In addition, the multiplexing section of the above mentioned optical transmission network may have a plurality of multiplexers respectively corresponding to a plurality of optical signals of different wavelengths output from the one CWDM network, and the de-multiplexing section may have a plurality of de-multiplexers respectively corresponding to the plurality of multiplexers, and there may be provided an optical switch which performs switching of the CWDM networks to which are applied the optical signals which have been respectively branched by the plurality of de-multiplexers. Alternatively, there may be provided an optical switch for performing switching of optical signals output from the one CWDM network to the plurality of multiplexers. With such a configuration, by switching the optical switch, connection between the CWDM networks can be flexibly performed.

According to the optical transmission network of the present invention as described above, it is possible to mutually connect between a plurality of CWDM networks which are independently provided at separated locations, which had been difficult with conventional technology, using optical transmission paths of a DWDM network. Therefore it is possible to realize a longer distance for CWDM networks.

Other objects feature and advantages of the present invention will become apparent from the following description of the embodiments, in conjunction with the appended drawings.

DETAILED DESCRIPTION OF THE INVENTION

Hereunder is a description of a best mode for implementing the present invention, with reference to the appended drawings. Throughout all the drawings, the same reference symbols denote the same or equivalent parts.

Figure 1:
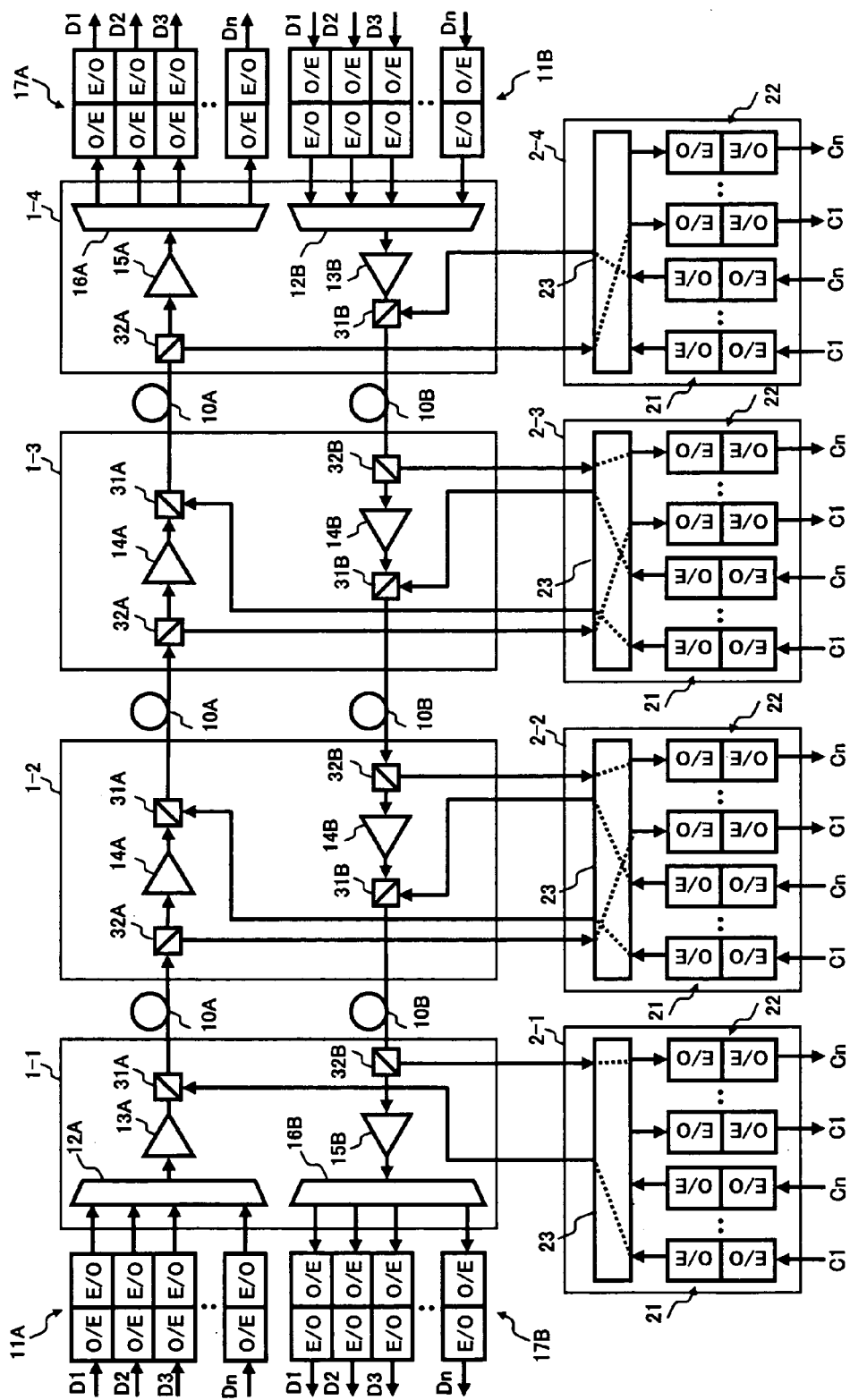
FIG. 1 is a block diagram showing a configuration of an optical transmission network of a first embodiment of the present invention.

FIG. 1 is a block diagram showing a configuration of an optical transmission network according to a first embodiment of the present invention.

In FIG. 1, an optical transmission network of the first embodiment comprises: a DWDM network where a plurality (here four) DWDM units 1-1, 1-2, 1-3, and 14 are sequentially connected via two optical transmission paths 10A and 10B; CWDM units 2-1, 2-2, 2-3, and 24 which are respectively adjacent to the DWDM units 1-1 to 1-4; a plurality of multiplexing filters 31A, 31B serving as multiplexing sections which combine the CWDM light output from the CWDM units 2-1 to 24 on the optical transmission paths 10A and 10B of the DWDM network; and a plurality of de-multiplexing filters 32A and 32B serving as de-multiplexing sections which branch the CWDM light transmitted on the optical transmission paths 10A and 10B of the DWDM network and send this to the CWDM units 2-1 to 24.

In the DWDM unit 1-1 arranged at one end of the DWDM network, the optical signals D1, D2, to Dn of wavelengths corresponding to the DWDM mode output from a transponder 11A are combined in a multiplexer 12A, to produce DWDM light. This DWDM light is amplified to a required level by a post amplifier 13A, and sent to the optical transmission path 10A. Furthermore, in the DWDM unit 1-1, the DWDM light which is transmitted by the optical transmission path 10B is amplified by a pre-amplifier 15B, and then branched into optical signals D1 to Dn of respective wavelengths by a demultiplexer 16B, and applied to a corresponding transponder 17B.

In the DWDM unit 14 arranged at the other end of the DWDM network, the DWDM light which is transmitted by the optical transmission path 10A is amplified by a pre-amplifier 15A, and then branched into optical signals D1 to Dn of respective wavelengths by a demultiplexer 16A, and applied to a corresponding transponder 17A. Moreover, in the DWDM unit 14 the optical signals D1, D2, to Dn of wavelengths corresponding to the DWDM mode output from a transponder 11B are combined in a multiplexer 12B, to produce DWDM light. This DWDM light is amplified to a required level by a post amplifier 13B, and sent to the optical transmission path 10B.

The DWDM units 1-2 and 1-3 are linear repeating devices which are arranged at required distances on the optical transmission paths 10A and 10B, and comprise an optical amplifier 14A which collectively amplifies DWDM light propagated on the optical transmission path 10A, and an optical amplifier 14B which collectively amplifies DWDM light propagated on the optical transmission path 10B.

The CWDM units 2-1 to 24 are each terminal equipment constituting a CWDM network (not shown in the figure), and comprise transponders 21 and 22 for performing transmission/reception signal processing of the optical signals C1 to Cn corresponding to the CWDM mode, and a multiplexer 23. The multiplexer 23 combines the optical signals C1 to Cn output from the transponder 21 and produces CWDM light, and has a transmission function for transmitting this CWDM light to the multiplexing filters 31A and 31B on the DWDM network, and a function for branching the CWDM light sent from the de-multiplexing filters 32A and 32B on the DWDM network into optical signals C1 to Cn of respective wavelengths, and applying these to the corresponding transponder 22.

The multiplexing filters 31A are respectively arranged on the optical transmission path 10A after the post amplifier 13A of the DWDM unit 1-1, and after the optical amplifiers 14A of the DWDM units 1-2 and 1-3, and the DWDM light output from the post amplifier 13A or the optical amplifier 14A is combined with the CWDM light which is sent from the corresponding CWDM units 2-1 to 2-3, and output on the optical transmission path 10A. Furthermore, the multiplexing filters 31B are respectively arranged on the optical transmission path 10B after the post amplifier 13B of the DWDM unit 1-4, and after the optical amplifiers 14B of the DWDM units 1-2 and 1-3, and the DWDM light output from the post amplifier 13B or the optical amplifier 14B is combined with the CWDM light which is sent from the corresponding CWDM units 2-2 to 2-4, and output on the optical transmission path 10B.

The de-multiplexing filters 32A are respectively arranged on the optical transmission path 10A before the optical amplifiers 14A of the DWDM units 1-2 and 1-3, and before the pre-amplifier 15A of the DWDM unit 1-4, and the light transmitted on the optical transmission path 10A is branched into DWDM light and CWDM light, and the DWDM light is applied to the optical amplifier 14A or the pre-amplifier 15A, and the CWDM light is sent to the corresponding CWDM units 2-2 to 24. Furthermore, the de-multiplexing filters 32B are respectively arranged on the optical transmission path 10B before the optical amplifiers 14B of the DWDM units 1-2 and 1-3, and before the pre-amplifier 15B of the DWDM unit 1-1, and the light transmitted on the optical transmission path 10B is branched into DWDM light and CWDM light, and the DWDM light is applied to the optical amplifiers 14B or the pre-amplifier 15B, and the CWDM light is sent to the corresponding CWDM units 2-1 to 2-3.

Next is a description of the operation of the first embodiment.

In the optical transmission network furnished with the above described configuration, connection between the plurality of CWDM networks provided at different locations separated by a distance corresponding to one repeater distance of the DWDM network, is performed using the optical transmission paths 10A and 10B of the DWDM network.

At first, describing in brief the usage wavelength of the optical signals in the present optical transmission network, in the DWDM network and the CWDM network, regarding the optical signals under current use, the wavelength range shown in the following Table 1 is common.

TABLE 1

| | | Wavelength range | Note |
|---|---|---|---|
| DWDM | C-band | 1530 to 1565 nm | 50 GHz, 100 GHz, 200 GHz intervals etc. |
| | L-band | 1565 to 1625 nm | |
| CWDM | | 1470 to 1610 nm | Central wavelength |

Figure 2:
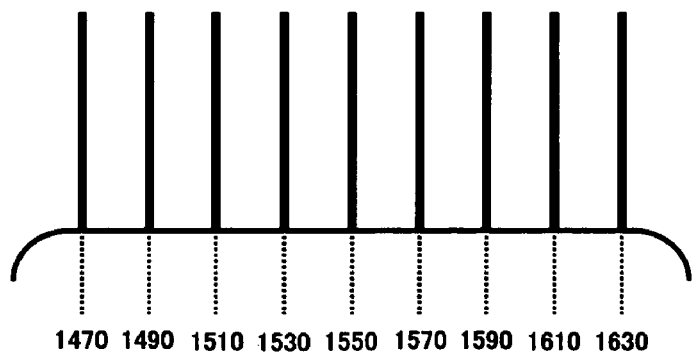
FIG. 2 is a diagram showing an example of usage wavelengths of an optical signal in a general CWDM network.

FIG. 2 shows an example of usage wavelengths of an optical signal in a general CWDM network. In the example of FIG. 2, optical signals with central wavelengths of 1470 nm, 1490 nm, 1510 nm, 1530 nm, 1550 nm, 1570 nm, 1590 nm, 1610 nm, and 1630 nm are used for the CWDM network.

Figure 3:
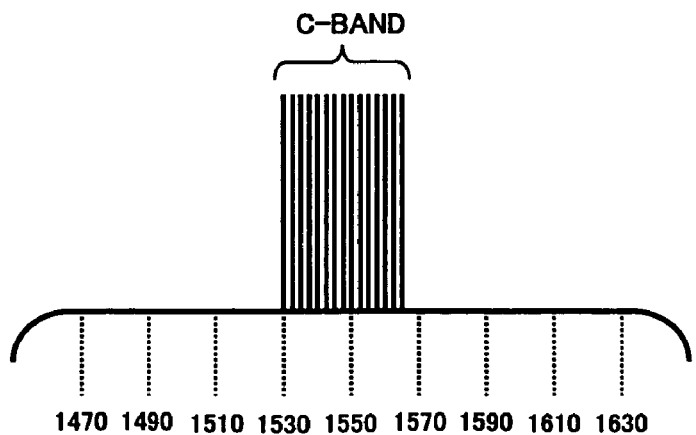
FIG. 3 is a diagram showing an allocation example of optical signals for when a C-band is used in a general DWDM network.
Figure 4:
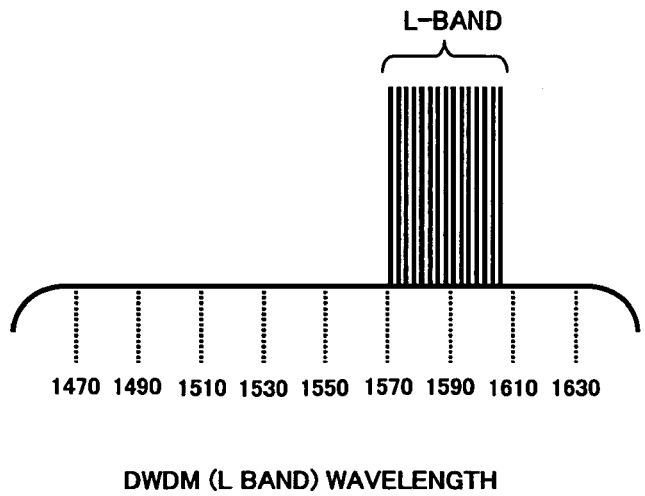
FIG. 4 is a diagram showing an allocation example of optical signals for when an L-band is used in a general DWDM network.

FIG. 3 shows an allocation example of optical signals for when a C-band is used in a general DWDM network. Furthermore, FIG. 4 shows an allocation example of optical signals for when an L-band is used in a general DWDM network. In the examples of FIG. 3 and FIG. 4, many optical signals arranged in a high density at intervals of 50 GHz, 100 GHz, or 200 GHz in respective wavelength ranges of 1530 to 1565 nm (C-band) and 1565 to 1625 nm (L-band) are used in the DWDM network.

Figure 5:
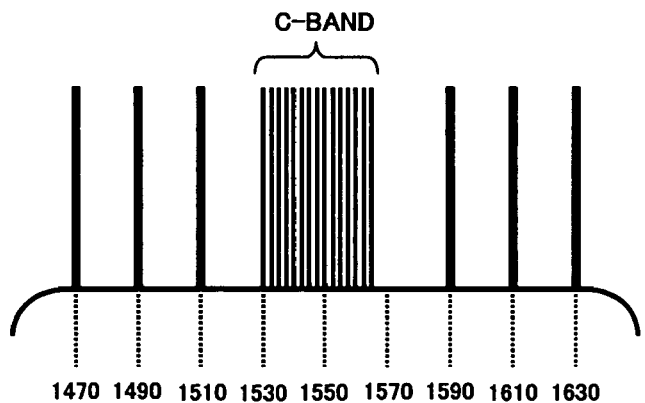
FIG. 5 is a diagram showing an example of usage wavelengths for a case where a C-band DWDM network is used in the present invention to realize a connection of a CWDM network.
Figure 6:
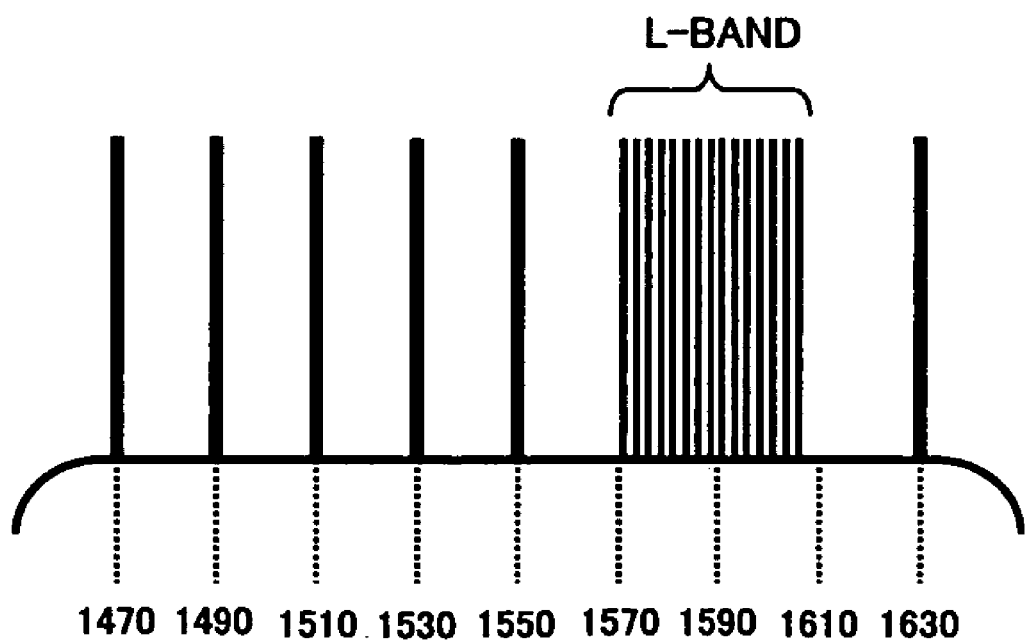
FIG. 6 is a diagram showing an example of usage wavelengths for a case where an L-band DWDM network is used in the present invention to realize a connection of a CWDM network.

In the optical transmission network of this embodiment, on the optical transmission paths 10A and 10B of the DWDM network which uses the C-band or the L-band, the optical signals used in the CWDM network are directly combined. Therefore the optical signal which overlaps the usage wavelength of the DWDM, of the usage wavelengths of the CWDM shown in FIG. 2 cannot be used in the connection between the plurality of CWDM networks. Consequently, in the present optical transmission network, in the case where connection of the CWDM network is realized using the DWDM network of the C-band, then for example as shown in FIG. 5, for the CWDM usage wavelength, one where the C-band is excluded is set, more specifically, a total of 6 wavelengths of three waves (1470 nm, 1490 nm, and 1510 nm) on the short wavelength side of the C-band, and three waves (1590 nm, 1610 nm, and 1630 nm) on the long wavelength side are set. Furthermore, in the case where the L-band DWDM network is used, then for example as shown in FIG. 6, for the CWDM usage wavelength, one where the L-band is excluded is set, more specifically, a total of 6 wavelengths of five waves (1470 nm, 1490 nm, 1510 nm, 1530 nm, and 1550 nm) on the short wavelength side of the L-band, and one wave (1630 nm) on the long wavelength side are set. The above described setting examples do not limit the usage wavelengths of the optical signals in the present invention.

Next is a description of the operation for when connecting between a plurality of CWDM networks using the optical transmission paths 10A and 10B of the DWDM network. Here as a specific example, a connection operation between the CWDM unit 2-2 and the CWDM unit 2-3 is described in detail.

In the CWDM unit 2-2 of FIG. 1, focusing for example on the optical signal C1 of the optical signals C1 to Cn output from the plurality of transponders 21, the optical signal C1, after passing through the multiplexer 23 is sent to the multiplexing filter 31A located after the optical amplifier 14A inside the DWDM unit 1-2 adjacent to the CWDM unit 2-2. In the multiplexing filter 31A, the DWDM light output from the optical amplifier 14A, and the optical signal C1 output from the CWDM unit 2-2 are combined, and output to the optical transmission path 10A. The distance between the adjacent DWDM unit 1-1 and the DWDM unit 1-3 is a distance (for example approximately 80 to 100 km) in which CWDM light can be transmitted without being amplified. The optical signal C1 output from the DWDM unit 1-2 is propagated on the optical transmission path 10A together with the DWDM light, and reaches to the DWDM unit 1-3. In the DWDM unit 1-3, the optical signal C1 propagated on the optical transmission path 10A is branched from the DWDM light by the de-multiplexing filter 32A arranged before the optical amplifier 14A, and is sent to the CWDM unit 2-3 adjacent to the DWDM unit 1-3. In the CWDM unit 2-3, the optical signal C1 from the de-multiplexing filter 32A is applied to the corresponding transponder 22 via the multiplexer 23. As a result, the optical signal C1 output from the CWDM unit 2-2 is directly sent to the CWDM unit 2-3 provided at a location apart from the CWDM unit 2-2 via the optical transmission path 10A of the DWDM network, without signal conversion corresponding to the DWDM being performed.

Furthermore, in the CWDM unit 2-3, focusing for example on the optical signal Cn of the optical signals C1 to Cn output from the plurality of transponders 21, the optical signal Cn, after passing through the multiplexer 23 is sent to the multiplexing filter 31B located after the optical amplifier 14B inside the DWDM unit 1-3 adjacent to the CWDM unit 2-3. In the multiplexing filter 31B, the DWDM light output from the optical amplifier 14B, and the optical signal Cn from the CWDM unit 2-3 are combined, and output to the optical transmission path 10B. The optical signal Cn output from the DWDM unit 1-3 is propagated on the optical transmission path 10B together with the DWDM light, and reaches to the DWDM unit 1-2. In the DWDM unit 1-2, the optical signal Cn propagated on the optical transmission path 10B is branched from the DWDM light by the de-multiplexing filter 32B arranged before the optical amplifier 14B, and is sent to the CWDM unit 2-2 adjacent to the DWDM unit 1-2. In the CWDM unit 2-2, the optical signal Cn from the de-multiplexing filter 32B is applied to the corresponding transponder 22 via the multiplexer 23. As a result, the optical signal Cn output from the CWDM unit 2-3 is directly sent to the CWDM unit 2-2 via the optical transmission path 10B of the DWDM network, without signal conversion corresponding to the DWDM being performed.

In the above description, the connection between the CWDM unit 2-2 and the CWDM unit 2-3 was specifically shown. However similarly to this, connection is of course also possible between the adjacent other CWDM units (between the CWDM units 2-1 and 2-2, and between the CWDM units 2-3 and 24).

Furthermore, for example between the CWDM unit 2-1 and the CWDM unit 2-3 can also be connected by the DWDM network and the CWDM unit 2-2. In this case, to describe briefly, the optical signal C1 output from the CWDM unit 2-1, similarly to the abovementioned case, is transmitted to the transponder 22 of the adjacent CWDM unit 2-2 via the optical transmission path 10A of the DWDM network. Then, this optical signal C1 is passed over the transponder 21 inside the same CWDM unit 2-2. By so doing, the optical signal C1 output from the transponders 21 is further transmitted to the transponder 22 of the adjacent CWDM unit 2-3 via the optical transmission path 10A of the DWDM network.

In the above manner, according to the optical transmission network of the first embodiment, it is possible to mutually connect between a plurality of CWDM networks which are independently provided at separated locations, which had been difficult with conventional technology, using the optical transmission paths 10A and 10B of the DWDM network. Therefore it is possible to realize a longer distance of DWDM networks.

In the abovementioned first embodiment, the configuration example was shown where the CWDM units 2-1 to 2-4 corresponding to all the DWDM units 1-1 to 14 on the DWDM network were connected. However it is also possible to connect the CWDM unit to only the DWDM unit of an adjacent part on the DWDM network.

Next is a description of a second embodiment of the present invention. In the second embodiment, as an application example of the abovementioned first embodiment, the optical signal output from the CWDM unit is converted to an optical signal corresponding to DWDM in the terminal equipment of the DWDM network, and is repeater transmitted between the respective DWDM units.

Figure 7:
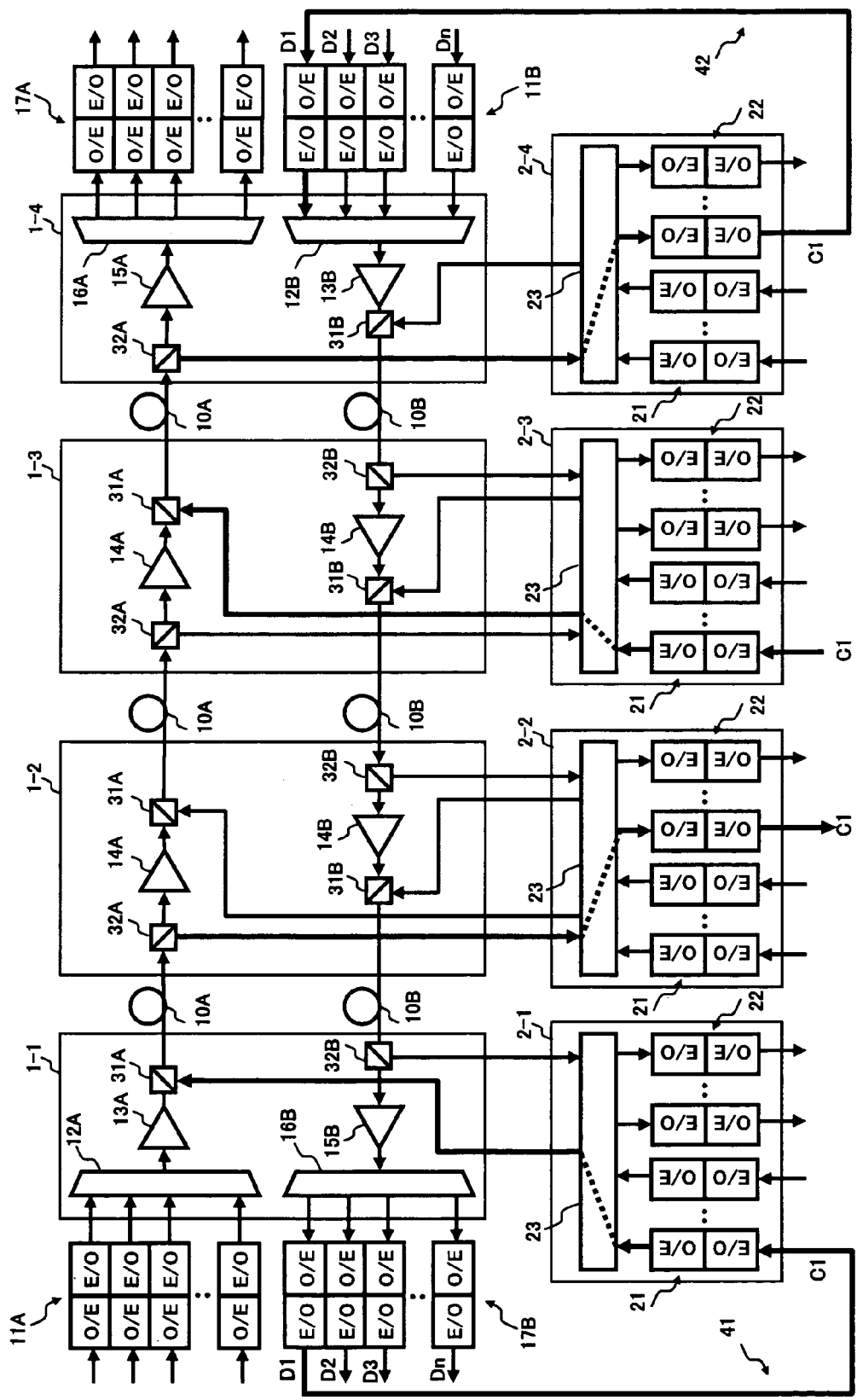
FIG. 7 is a block diagram showing a configuration of an optical transmission network according to a second embodiment of the present invention.

FIG. 7 is a block diagram showing a configuration of an optical transmission network according to the second embodiment of the present invention.

In FIG. 7, the point where the configuration of this optical transmission network differs to the configuration of the aforementioned first embodiment shown in FIG. 1 is the point that a bus 41 for forwarding the signal is provided between transponders 11A and 17B of the DWDM unit 1-1 arranged on one end of the DWDM network, and transponders 21 and 22 of the CWDM unit 2-1, and the point that a bus 42 for forwarding the signal is provided between transponders 11B and 17A of the DWDM unit 1-4 arranged on the other end of the DWDM network, and transponders 21 and 22 of the CWDM unit 2-4. However, in order to more easily understand the figure, in FIG. 7, only the buses 41 and 42 of one part corresponding to the optical signal C1 are shown. The configuration of the other parts other than for the abovementioned points is the same as for the case of the aforementioned first embodiment, and description is here omitted.

In the optical transmission network of the abovementioned configuration, for example the optical signal C1 output from the transponder 21 of the CWDM unit 2-3, at first, similarly to the case of the abovementioned first embodiment, is sent to the transponder 22 of the adjacent CWDM unit 24 via the optical transmission path 10A of the DWDM network. Then, information received by the transponder 21 is transmitted to the transponder 11B of the DWDM unit 1-4 via the bus 42.

In the transponder 11B (signal conversion section) of the DWDM unit 1-4, an optical signal D1 corresponding to the DWDM on which information from the CWDM unit 2-4 is stacked, is produced. This optical signal D1 is combined with the other optical signals D2 to Dn in the multiplexer 12B, and is transmitted through the post amplifier 13B and the multiplexing filter 31B to the optical transmission path 10B. The DWDM light transmitted to the optical transmission path 10B is repeater transmitted up to the DWDM unit 1-1 while being collectively amplified in the optical amplifier 14B of the DWDM unit 1-3, and in the optical amplifier 14B of the DWDM unit 1-2. The DWDM light which reaches the DWDM unit 1-1 passes through the de-multiplexing filter 32B and the pre-amplifier 15B and is branched in the demultiplexer 16B into the optical signals D1 to Dn of respective wavelengths, and sent to the corresponding transponder 17B. The information received in the transponder 17B corresponding to the optical signal D1 is transmitted to the transponder 21 of the CWDM unit 2-1 via the bus 41.

In the transponder 21 (signal reconversion section) of the CWDM unit 2-1, signal light C1 corresponding to CWDM on which information from the DWDM unit 1-1 is stacked, is produced. This optical signal C1, similarly to the case of the aforementioned first embodiment, is received by the transponder 22 of the adjacent CWDM 2-2 via the optical transmission path 10A of the DWDM network. As a result, the optical signal C1 transmitted from the CWDM unit 2-3 is converted into a temporary optical signal D1 corresponding to DWDM, and after being relay transmitted on the DWDM network is again converted to an optical signal C1 corresponding to CWDM, and sent up to the target CWDM unit 2-2.

In the above example, as a result, the optical signal C1 is transmitted from the CWDM unit 2-3 to the adjacent CWDM unit 2-2. Therefore the merit of converting the optical signal C1 to an optical signal D1 corresponding to DWDM, and repeater transmitting on the DWDM network from end to end is minimal. However if there is a long distance from the signal originating CWDM unit to the target CWDM unit, then the merit of performing signal conversion from CWDM to DWDM as in this embodiment, and transmitting the optical signal over a long distance by the DWDM network is great. Therefore, the configuration of this embodiment is effective particularly for large scale networks. Furthermore, in this example the connection operation between the CWDM units 2-3 and 2-1 has been explained focusing on the optical signal C1. However the connection operation between the other optical signals C2-Cn and the other CWDM units can also be considered the same as for the above example.

Next is a description of a third embodiment of the present invention. In the third embodiment, as a further application example to the abovementioned first embodiment, the wavelength of the optical signal corresponding to CWDM transmitted via the DWDM network is changed.

Figure 8:
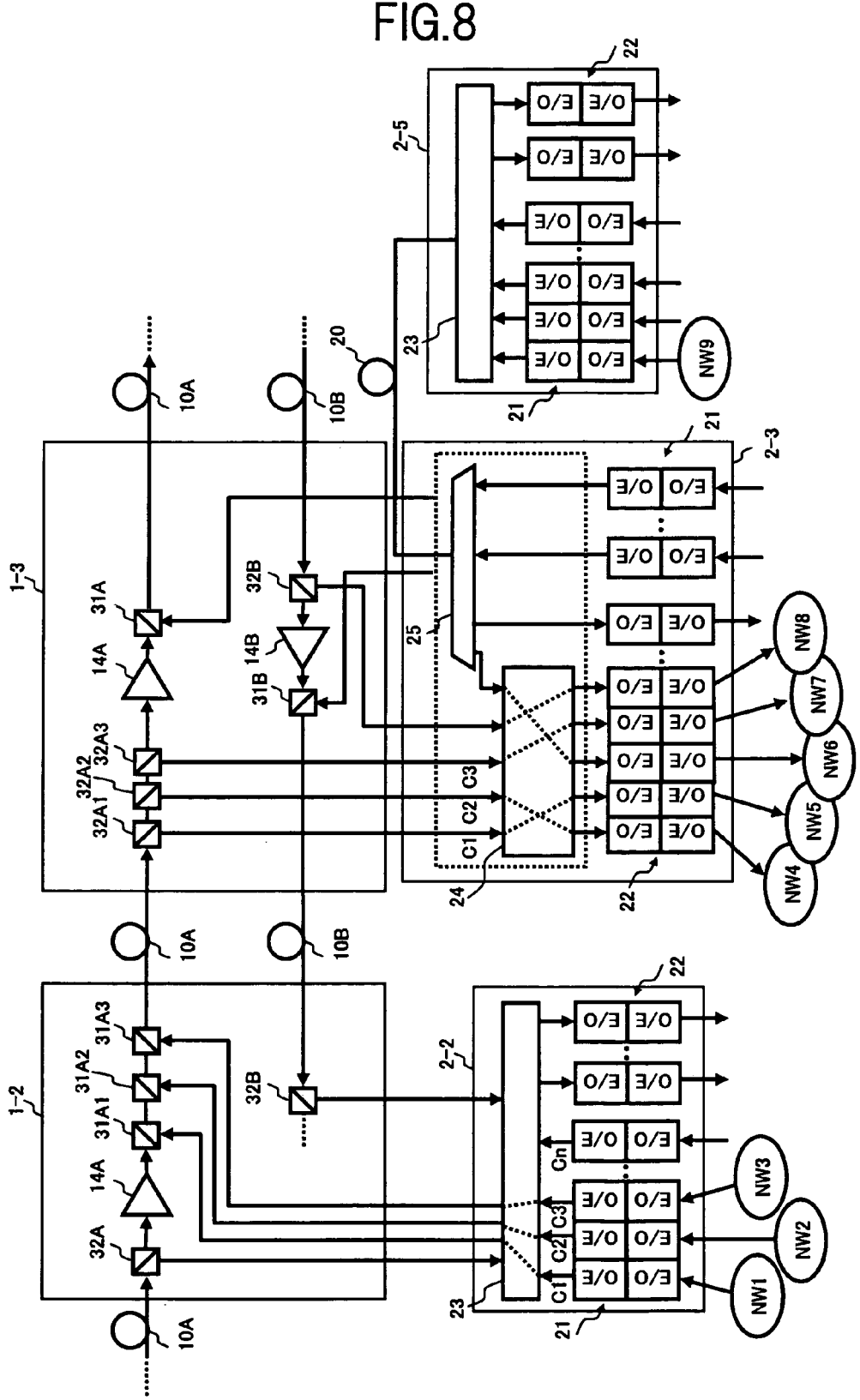
FIG. 8 is a block diagram showing a main component configuration of an optical transmission network according to a third embodiment of the present invention.
Figure 9:
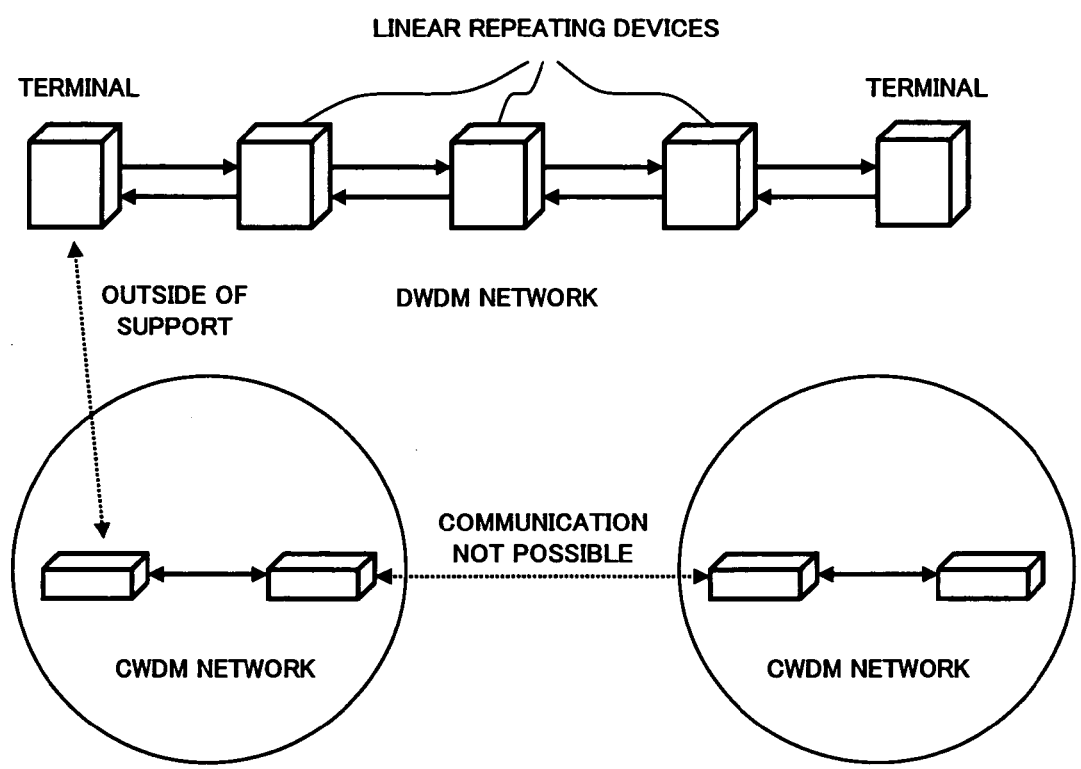
FIG. 9 is a diagram showing a schematic configuration of a conventional DWDM network and CWDM network.
Figure 10:
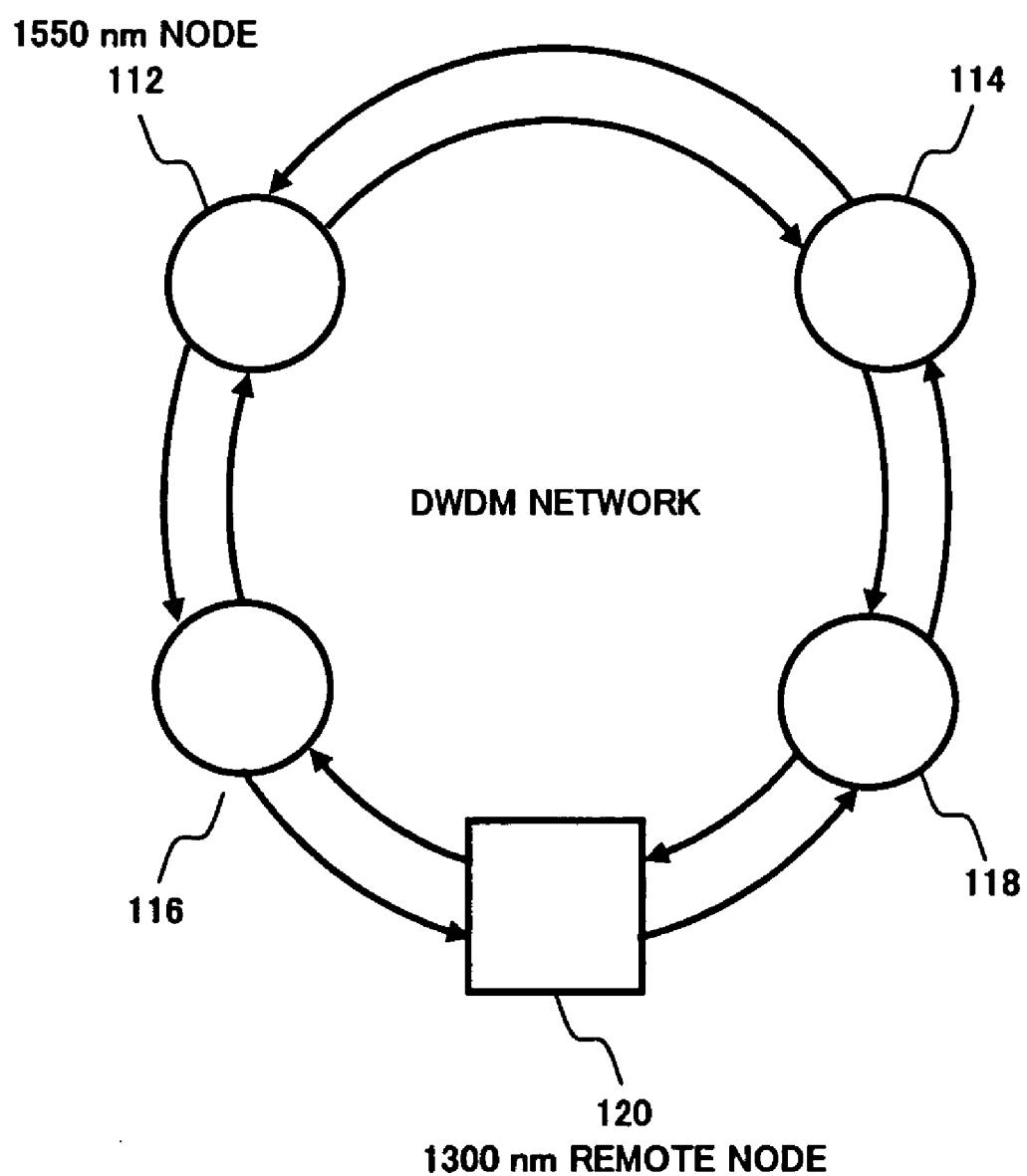
FIG. 10 is a diagram for explaining conventional technology related to DWDM network add/drop nodes.

FIG. 8 is a block diagram showing a configuration of the main parts of the optical transmission network according to the third embodiment of the present invention.

In FIG. 8, in the configuration of the abovementioned first embodiment shown in FIG. 1, for example in the DWDM unit 1-2, multiplexing filters 31A1, 31A2, and 31A3 corresponding respectively to the optical signals C1 to C3 sent from the CWDM unit 2-2 are arranged in sequence after the optical amplifier 14A. Here CWDM networks NW1 to NW3 of other sections, are connected to transponders 21 which output the optical signals C1 to C3 of the CWDM unit 2-2.

In the DWDM unit 1-3, de-multiplexing filters 32A1, 32A2, and 32A3 corresponding to the abovementioned multiplexing filters 31A1, 31A2, and 31A3 are arranged in sequence before the optical amplifier 14A. Furthermore, in the CWDM unit 2-3 which receives the optical signals C1 to C3 which are branched by the abovementioned de-multiplexing filters 32A1, 32A2, and 32A3, instead of the multiplexer 23 used in the first embodiment, an optical switch 24 and a WDM coupler 25 are provided. The optical switch 24 is capable of switching the output destination of the optical signals which are sent from the de-multiplexing filters 32A1 to 32A3, 32B, and the WDM coupler 25, to any of the transponders 22 which are respectively connected to the CWDM networks NW4 to NW8 of the other sections. The other CWDM unit 2-5 adjacent to the CWDM unit 2-3 is connected to the WDM coupler 25 via a dedicated optical transmission path 20.

In the optical transmission network of the abovedescribed configuration, for example the respective optical signals from the CWDM networks NW1 to NW3 are applied to the respective multiplexing filters 31A1 to 31A3 via the transponder 21 and the multiplexer 23 of the CWDM unit 2-2, and send on the optical transmission path 10A of the DWDM network. The optical signals C1 to C3 output from the DWDM unit 1-2 are propagated on the optical transmission path 10A together with the DWDM light and reach to the DWDM unit 1-3, and the respective optical signals C1 to C3 are respectively branched from the DWDM light in the de-multiplexing filters 32A1 to 32A3 arranged before the optical amplifier 14A, and sent to the CWDM unit 2-3.

In the CWDM unit 2-3, the optical signals C1 to C3 from the respective de-multiplexing filters 32A1 to 32A3 are input to the optical switch 24. To the optical switch 24, is input the optical signal from the de-multiplexing filter 32B on the optical transmission path 10B, and also the optical signal sent from the CWDM unit 2-5 via the optical transmission path 20 and the WDM coupler 25. Then, due to switching of the optical switch 24, the transponder 22 which becomes the output destination of the optical signals, is optionally selected, so that the respective optical signals are sent to the desired CWDM networks NW4 to NW8. The switching condition of the optical switch 24 shown by the dotted lines in FIG. 8 is to send the optical signal C1 from the CWDM network NW1 to the CWDM network NW5, the optical signal C2 from the CWDM network NW2 to the CWDM network NW4, the optical signal C3 from the CWDM network NW3 to the CWDM network NW7, the optical signal branched by the de-multiplexing filter 32B to the CWDM network NW8, and the optical signal from the CWDM network 2-5 to the CWDM network NW6.

According to the optical transmission network of the third embodiment as described above, by switching of the optical switch 24, the optical signals C1 to C3 from the CWDM networks NW1 to NW3 can be transmitted to the optical CWDM networks NW4 to NW8. Therefore the connection between the CWDM networks can be imparted with flexibility.

In the abovementioned third embodiment, the configuration example is shown for where the optical switch is arranged in the CWDM unit 2-3, and the connection destination of the optical signals C1 to C3 from the CWDM unit 2-2 is switched on the reception side. However the present invention is not limited to this, and for example the abovementioned optical switch may be arranged in the CWDM unit 2-2, and the connection destination of the optical signals C1 to C3 switched on the transmission side. Furthermore, here the description is for the connection between the CWDM units 2-2 and 2-3. However, also in relation to the connection between the other CWDM units, the above configuration can be similarly adopted.

What is claimed is:

1. An optical transmission network where a dense wavelength division multiplexing network is used to mutually connected between a plurality of coarse wavelength division multiplexing networks, and said dense wavelength division multiplexing network comprises: a set of terminal equipment; an optical transmission path which connects between said terminal equipment; and at least one repeater device having an optical amplifier for collectively amplifying dense wavelength division multiplexing light, and which is arranged on said optical transmission path, said optical transmission network comprising:

a multiplexing section which is adjacent to one coarse wavelength division multiplexing network of said plurality of coarse wavelength division multiplexing networks, and is arranged on a light output terminal of either one of said terminal equipment and said repeater device, and which combines a coarse wavelength division multiplexing light of other than a usage wavelength band of said dense wavelength division multiplexing light, on the optical transmission path of said dense wavelength division multiplexing network, said coarse wavelength division multiplexing light which is a plurality of optical signals multiplexed by a multiplexer connecting to said coarse wavelength division multiplexing network, and a de-multiplexing section which is arranged on a light input terminal of either one of said repeater device and said terminal equipment adjacent to said terminal equipment or said repeater device in which said multiplexing section is arranged on the light output terminal, and which branches said coarse wavelength division multiplexing light combined on said optical transmission path by said multiplexing section, and which applies the branched coarse wavelength division multiplexing light to another coarse wavelength division multiplexing network adjacent to the repeater device or the terminal equipment.

2. An optical transmission network where a dense wavelength division multiplexing network is used to mutually connect between a plurality of coarse wavelength division multiplexing networks, and said dense wavelength division multiplexing network comprises: a set of terminal equipment; a first optical transmission path which transmits dense wavelength division multiplexing light between said terminal equipment in a first direction; a second optical transmission path which transmits in a second direction opposite to said first direction; and at least one repeater device which includes a first optical amplifier which collectively amplifies the dense wavelength division multiplexing light transmitted on said first optical transmission path, and a second optical amplifier which collectively amplifies the dense wavelength division multiplexing light transmitted on said second optical transmission path, said optical transmission network comprising:

a first multiplexing section which is adjacent to one coarse wavelength division multiplexing network of said plurality of coarse wavelength division multiplexing networks, and is arranged on a light output terminal corresponding to said first optical transmission path of either one of said terminal equipment and said repeater device, and which combines the optical signal of other than that the usage wavelength band of said dense wavelength division multiplexing light, of the optical signals transmitted by said coarse wavelength division multiplexing network, on said first optical transmission path;

a second multiplexing section which is arranged on a light output terminal corresponding to said second optical transmission path of either one of said repeater device and said terminal equipment adjacent to said terminal equipment or said repeater device which is arranged with said first multiplexing section on the light output terminal, and which combines the optical signal of other than that a usage wavelength band of said dense wavelength division multiplexing light, of the optical signals transmitted by said coarse wavelength division multiplexing network, on said second optical transmission path;

a first de-multiplexing section which is arranged on an optical input terminal corresponding to said first optical transmission path of said repeater device or said terminal equipment in which said second multiplexing section is arranged, which branches the signal light combined on said first optical transmission path by said first multiplexing section, and which applies the branched optical signal to said other coarse wavelength division multiplexing network, and a second de-multiplexing section which is arranged on an optical input terminal corresponding to said second optical transmission path of said repeater device or said terminal equipment in which said first multiplexing section is arranged, which branches the signal light combined on said second optical transmission path by said second multiplexing section, and which applies the branched optical signal to said one coarse wavelength division multiplexing network.

3. An optical transmission network according to claim 2, wherein when said other coarse wavelength division multiplexing network is adjacent to one terminal equipment of said dense wavelength division multiplexing network, said one terminal equipment has a signal conversion section which converts the optical signal which is branched by said first de-multiplexing section and which is sent to said other coarse wavelength division multiplexing network, into an optical signal corresponding to a dense wavelength division multiplexing mode, and sends this to said second optical transmission path, and said other terminal equipment has a signal re-conversion sections which re-converts the optical signal which is converted by said signal conversion section and transmitted by said second optical transmission path, into an optical signal of a coarse wavelength division multiplexing mode, and applies the reconverted optical signal to an adjacent other coarse wavelength division multiplexing network.

4. An optical transmission network according to claim 2, wherein said first and second multiplexing sections have a plurality of multiplexers respectively corresponding to a plurality of optical signals of different wavelengths output from said one coarse wavelength division multiplexing network, and said first and second de-multiplexing sections have a plurality of de-multiplexers respectively corresponding to said plurality of multiplexers, and there is provided an optical switch which performs switching of the coarse wavelength division multiplexing networks to which are applied the optical signals which have been respectively branched by said plurality of de-multiplexers.

5. An optical transmission network according to claim 2, wherein said first and second multiplexing sections have a plurality of multiplexers respectively corresponding to a plurality of optical signals of different wavelengths output from said one coarse wavelength division multiplexing network, and said first and second de-multiplexing sections have a plurality of de-multiplexers respectively corresponding to said plurality of multiplexers, and there is provided an optical switch for performing switching of optical signals output from said one coarse wavelength division multiplexing network to said plurality of multiplexers.

6. An optical transmission network according to claim 1, wherein when a usage wavelength band of said dense wavelength division multiplexing is a C-band, said multiplexer combines optical signals with central wavelengths of 1470 nm, 1490 nm, 1510 nm, 1590 nm, 1610 nm, and 1630 nm, on the optical transmission path of said dense wavelength division multiplexing network.

7. An optical transmission network according to claim 1, wherein when a usage wavelength band of said dense wavelength division multiplexing is an L-band, said multiplexer combines optical signals with central wavelengths of 1470 nm, 1490 nm, 1510 nm, 1530 nm, 1550 nm, and 1630 nm, on the optical transmission path of said dense wavelength division multiplexing network.

8. An optical transmission network according to claim 2, wherein when a usage wavelength band of said dense wavelength division multiplexing is a C-band, said first and second multiplexing sections combine optical signals with central wavelengths of 1470 nm, 1490 nm, 1510 nm, 1590 nm, 1610 nm, and 1630 nm, on the first and second optical transmission paths of said dense wavelength division multiplexing network.

9. An optical transmission network according to claim 2, wherein when a usage wavelength band of said dense wavelength division multiplexing is an L-band, said first and second multiplexing sections combine optical signals with central wavelengths of 1470 nm, 1490 nm, 1510 nm, 1530 nm, 1550 nm, and 1630 nm, on the first and second optical transmission path of said dense wavelength division multiplexing network.

\* \* \* \* \*